United States Patent [19]

Brubaker

[11] Patent Number: 4,523,937
[45] Date of Patent: Jun. 18, 1985

[54] MODEL ENGINE AIR FILTER

[76] Inventor: Thomas J. Brubaker, 5775 John R., Troy, Mich. 48098

[21] Appl. No.: 426,685

[22] Filed: Sep. 29, 1982

[51] Int. Cl.³ .................... B01D 39/16; B01D 46/10
[52] U.S. Cl. ........................................ 55/509; 55/491; 55/507
[58] Field of Search ............... 55/509, 507, 504, 491, 55/511, 385 B, DIG. 28

[56] References Cited

U.S. PATENT DOCUMENTS

| | | | |
|---|---|---|---|
| 1,398,685 | 11/1921 | Gordon | 55/509 X |
| 2,008,067 | 7/1935 | Faber | 55/509 X |
| 2,035,097 | 3/1936 | Schwartz | 55/507 X |
| 2,577,606 | 12/1951 | Conley | 55/507 X |
| 2,731,104 | 1/1956 | Baker et al. | 55/509 X |
| 2,981,367 | 4/1961 | Sprouse | 55/509 X |
| 3,302,375 | 2/1967 | Miller | 55/507 X |
| 3,341,013 | 9/1967 | Moulton | 55/511 X |
| 3,347,026 | 10/1967 | Zankey | 55/350 X |
| 3,481,117 | 12/1969 | McKinlay | 55/385 B |
| 3,796,027 | 3/1974 | Gumtow | 55/509 X |
| 3,932,153 | 1/1976 | Byrns | 55/511 |
| 3,950,157 | 4/1976 | Matney | 55/491 X |
| 4,099,944 | 7/1978 | Davis | 55/509 X |

*Primary Examiner*—Kathleen J. Prunner
*Attorney, Agent, or Firm*—Burton, Parker & Schramm

[57] ABSTRACT

An air cleaner for miniature internal combustion engines to be used on model boats, airplanes, and the like, which is comprised of a tubular elastic boot and a removable filter unit. One end of the tubular elastic boot is stretched over and sealingly attached to the air inlet of the engine. Into the other end of the elastic boot member is inserted the filter unit so that all the air entering the engine must pass through the filter. The filter unit is comprised of a porous open cell foam medium which is supported on a peripheral flange to sealingly engage the elastic boot member.

6 Claims, 4 Drawing Figures

MODEL ENGINE AIR FILTER

DESCRIPTION

1. Field of Invention

This invention relates to the field of air cleaners for internal combustion engines and more particularly to air filters for miniature engines used in model boats, airplanes and helicopters.

2. Background of the Invention

Miniature engines used to power model boats and planes have typically run with an unrestricted engine air inlet which is open to the atmosphere. The incoming air charge has varying amounts of suspended dirt and dust particles which upon entering the engine tend to promote wear and premature failure of the engine's moving parts. Numerous hobbyists have fabricated various means of filtering the inlet air or ducting the air inlet to a region where there is less suspended dirt particles. There, however, has been no air filter unit available to conveniently fit on the wide number of miniature engines available and allow the easy removal for cleaning and replacement of the filter element. Due to the increase in popularity of model helicopters which fly relatively low to the ground and tend to generate a large amount of dust, the need for a commercially available air filter for miniature engines has become even more acute.

SUMMARY OF THE INVENTION

I have invented an air cleaner for small internal combustion engines which is comprised of a pliable boot member which is sealingly mounted on the engine air inlet, and a filter unit which can be replaceably attached to the support member so that all the air entering the inlet must pass through the filter. The filter unit consists of a porous filter medium capable of entrapping suspended dirt and dust particles and a peripheral flange of a rigid material which is attached to the outer edge of the filter medium forming a replaceable unit. When the filter medium becomes clogged or dirty after engine operation, the filter unit can be removed from the pliable boot member so the filter unit may be cleaned or replaced.

The elastic boot member is formed of a pliable rubber-like material which is capable of withstanding the temperature found in the region immediately adjacent to the operating engine and such material must also be impervious to attack by model engine fuels which may be mixtures of gasoline, methyl alcohol, nitromethane and castor oil. The materials used in forming the filter unit similarly must be capable of withstanding attack by temperature and fuel found in this environment.

BRIEF DESCRIPTION OF PREFERRED EMBODIMENT

Figure 1:
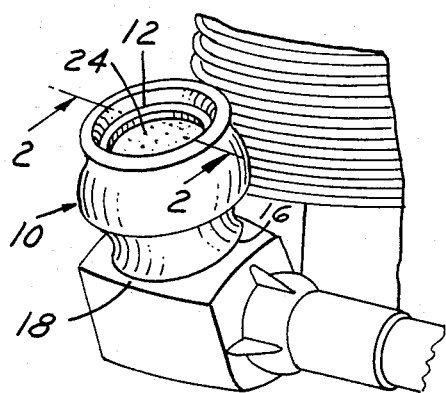
FIG. 1 is a perspective view of the air cleaner installed on a miniature engine air inlet.

Referring to the drawings, the novel air cleaner comprises two main components: An elastic boot member 10 and a filter unit 12. The boot member 10 is generally tubular in shape, being symmetrical about its centerline and having an inlet opening 14 and an outlet opening 16 on its ends. Opposite ends of the boot have radially outwardly flared flanges 17a and 17b with the boot being inwardly necked adjacent the flanges as at 19a and 19b. The boot member is installed on the engine air inlet 18 by stretching the outlet opening 16 and its flange 17b over the tubular flange 20 on the engine inlet. The size and the resilient nature of boot member 10 and outlet opening 16 cause the boot member 10 to be firmly held to tubular flange 20. The central portion of support member 10 contains an internal annular groove 22 in which filter unit 12 fits. Filter unit 12 is installed within boot member 10 by inserting the filter unit 12 through inlet opening 14, stretching boot member 10 around filter unit 12.

Figure 3:
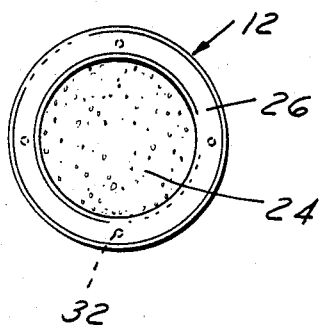
FIG. 3 is a plan view of a filter unit assembly.
Figure 2:
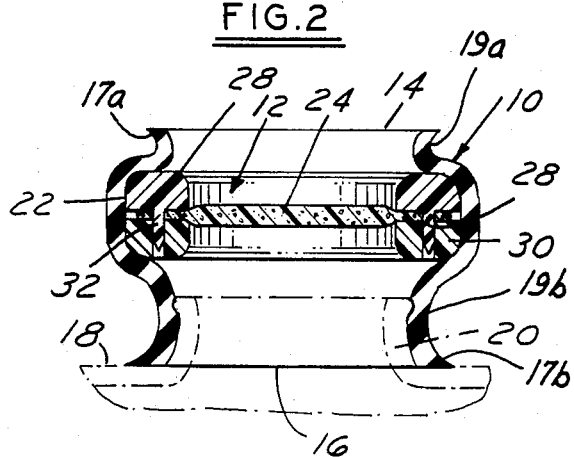
FIG. 2 is a side elevation taken on line 2—2 of FIG. 1 showing the air cleaner installed on an engine air inlet.
Figure 4:
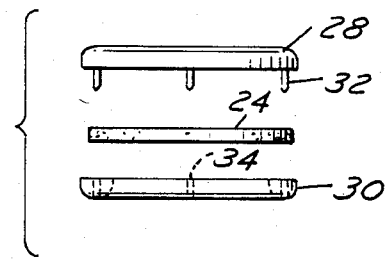
FIG. 4 is an exploded side view of a filter unit assembly.

Filter unit 12 is generally flat and thin, as shown, and comprises a porous filter medium 24 which is attached to and supported by a rigid peripheral flange 26, as shown in FIG. 3. Peripheral flange 26 can be comprised of single or multiple rings formed of metal or plastic material. The preferred arrangement is shown in FIGS. 2 and 4, where peripheral flange 26 is formed by two plastic rings 28 and 30. Filter medium 24 is placed between rings 28 and 30, and a single unit is formed by compressing the three parts together and sealingly securing them using adhesive or welds. To aid the alignment of rings 28 and 30 and filter medium 24 during the assembly and bonding process, it is desirable to have dowel pins 32 on ring 28 and corresponding alignment holes 34 on ring 30. Dowels 32 puncture filter medium 24 and enter alignment holes 30 as the three parts are assembled and prevent the filter medium 24 from slipping out of engagement with rings 28 and 30 during bonding.

Filter medium 24 can be formed of any porous material which will allow the passage of air and the entrapment of suspended particles and be impervious to attack by model engine fuel. It has been found that an open-cell ester based polyurethane synthetic rubber expanded foam material having a 45 to 65 pore rating works the best in common model applications. Since any restriction in the air inlet reduces maximum power output, it is desirable to have a filter with as little restriction as possible, yet be sufficient to trap suspended dirt and dust particles. This invention readily lends itself to changing filter media, since the filter unit can be removed from the boot member and cleaned or replaced with a filter unit having a different filter medium porosity to meet the current needs of the user.

During operation of the engine, the air cleaner will be exposed to elevated temperatures and large amounts of model engine fuel. It is important, therefore, to use materials to fabricate the boot, filter medium, and peripheral flange that are not soluble in model engine fuel nor lose their structural properties nor age-harden when exposed to the temperatures found immediately adjacent to the model engine air inlet. It has been found that neoprene is a suitable material to form the boot member, as this material meets the desired performance criteria and also lends itself to dip-molding. Ester based polyurethane foam has been found to be a suitable material for the filter medium, and nylon has been found to be a suitable peripheral flange material as a result of its ability to be injection molded and bonded using a cyanoacrylic adhesive.

It is important that all the air entering the inlet pass through the filter medium to prevent dirt and dust from entering the engine. It is, therefore, necessary that the boot 10 for an airtight seal with the engine inlet flange 20 and the outer edge of the filter unit peripheral flange 26. It is also important that the entire edge of filter medium 24 be airtightly bonded to the peripheral flange 26 so that no leak path is created which would allow dirt to enter the engine. The axial dimension of the boot member 10 between the end 16 and the groove 22 is such that upon stretching the boot member flange 17b over the varying size engine air inlets it will not impair the sealing fit of the groove 22 about the filter unit 12.

I claim:

1. An air cleaner for a miniature internal combustion engine wherein the air cleaner is mounted to the engine air inlet comprising:

a thin, flat filter member;

a tubular elastic boot member open at opposite ends with the boot member having an increased diameter portion intermediate said opposite ends defining an internal groove for receiving the filter member;

said filter member disposed in said groove by stretching one of said ends over said filter member so as to seal said filter member within said groove;

said boot member at opposite ends of the increased diameter portion being radially inwardly necked and terminating in radially outwardly extending peripheral flared flanges at said opposite ends of the boot member; and said boot member having a longer axial dimension between said groove and the other of said ends than between said groove and said one end, whereby the stretching of said other end over the engine air inlet will not impair the sealing fit of said groove of the boot member about the filter member.

2. The air cleaner of claim 1 where said filter member is comprised of a porous filter medium which is attached to a rigid peripheral flange.

3. The air cleaner of claim 2 wherein said flange is formed by two ring-shaped members between which the filter medium is placed and sealingly secured, forming a single unit.

4. The air cleaner of claim 3 wherein the filter medium comprises an expanded open cell foam material.

5. The invention defined by claim 4 wherein said foam material is a synthetic rubber material having a 45 to 65 pore rating.

6. The air cleaner of claim 1, wherein the filter member comprises an expanded open cell foam material.

* * * * *